Sept. 16, 1930.  F. C. LINN  1,776,125
METHOD OF AND MEANS FOR BALANCING ROTORS
Filed Sept. 17, 1928
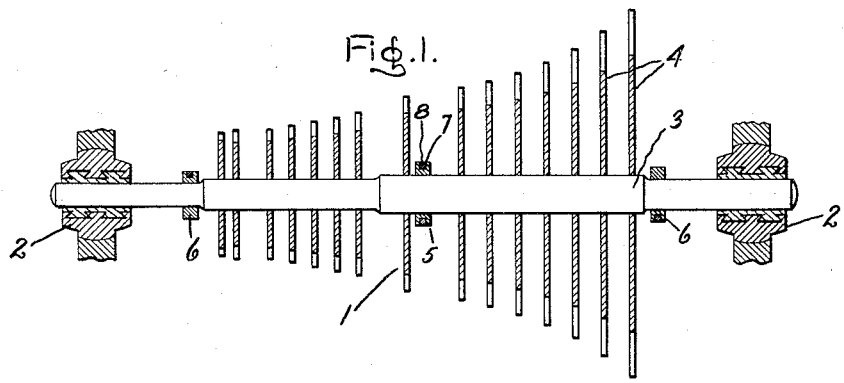
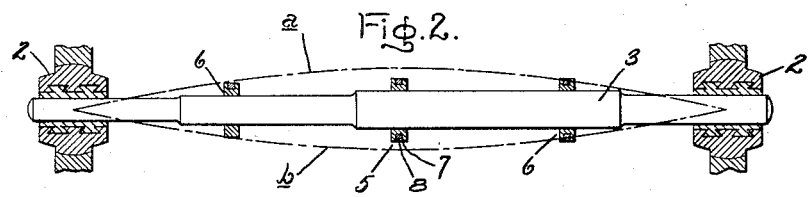
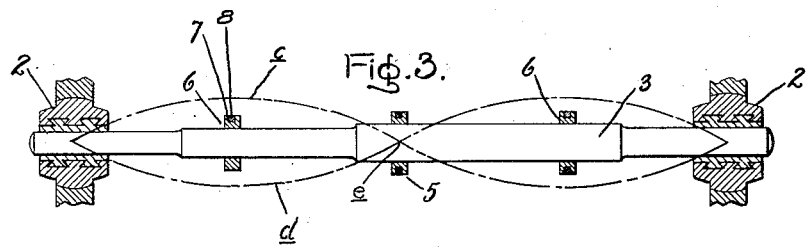
Inventor:
Frank C. Linn
by Charles E. Mullan
His Attorney Patented Sept. 16, 1930

1,776,125

UNITED STATES PATENT OFFICE

FRANK C. LINN, OF LYNN, MASSACHUSETTS, ASSIGNOR TO GENERAL ELECTRIC COMPANY, A CORPORATION OF NEW YORK

METHOD OF AND MEANS FOR BALANCING ROTORS

Application filed September 17, 1928. Serial No. 306,469.

The present invention relates to the balancing of rotors which operate at relatively high speeds, such as for example, the rotors of an elastic fluid turbine, and especially to the balancing of such rotors intended for operation at speeds above the first critical speed.

In connection with high speed rotors, it has been the practice to balance the rotors by means of balancing weights, such as weights placed in balancing rings, in a manner such that the amplitude of vibration at normal running speed and at first critical speed would be within desired limits, it being permissible to have a somewhat greater amplitude of vibration at first critical speed than at running speed. For example, in commercial practice, a rotor may be balanced so that at first critical speed the vibration of the shaft next to the bearings is of the order of 5 mils and at running speed is of the order of 2 mils. Greater vibration at first critical speed is permissible because the rotor operates at first critical speed for only a very short period of time when the turbine is being started up or stopped.

If the rotor is operated at a running speed a considerable amount higher than first critical speed, the effect of second critical speed begins to be felt. Actually the second critical speed may be of the order of 3½ to 4 times the first critical speed but often the effect of second critical speed will become apparent after reaching a speed of the order of 1.8 times first critical speed. Accordingly, if a rotor is to operate at a speed such that the effect of second critical speed begins to be felt, then in balancing the rotor it becomes necessary to take account of the balance for second critical speed.

The object of my invention is to provide an improved method of and means for dynamically balancing a rotor whereby the effect of the second critical speed is taken into account, and for a consideration of what I believe to be novel and my invention, attention is directed to the accompanying description and the claims appended thereto.

In the drawing, Fig. 1 is a view of a rotor balanced in accordance with my invention, and Figs. 2 and 3 are explanatory diagrams.

Referring to the drawing, 1 indicates a rotor supported at its ends in bearings 2. In the present instance a turbine rotor comprising a shaft 3 and bucket wheels 4 mounted thereon is illustrated.

According to my invention, I balance the rotor for first critical speed principally by means of a weight located in the vicinity of the nodal point of the rotor at second critical speed and I then balance the rotor for running speed by means of weights located in the vicinity of the ends of the rotor. By this means, the result is obtained that the weight used for balancing for first critical speed has little effect on the balance so far as second critical speed is concerned and the weights which are used for balancing at running speed take care of vibration which may be due to the second critical speed without materially affecting the balance of the rotor for first critical speed.

Referring to the drawing, 5 indicates a balancing ring placed in the vicinity of the nodal point of the rotor at the second critical speed for adding weights to balance the rotor at first critical speed, and 6 indicates balancing rings placed in the vicinity of the bearings and utilized for balancing the rotor at running speed by the addition of weights. The balancing rings are provided with spaced tapped holes 7 for the reception of suitable balancing weights 8.

Referring to Fig. 2, the nature of the vibration of the shaft at first critical speed is indicated in exaggerated form by the lines $a$ and $b$. At first critical speed all the fibers on the same side of the shaft are bowed in the same direction and the shaft, slightly bowed, whirls about its geometrical axis. This whirling action sets up movements which can be measured at the bearings as vibrations. It will be clear that by adjusting the balancing weight or weights in the ring 5 the rotor can be balanced for this speed.

Referring now to Fig. 3, the nature of the vibrations of the shaft at second critical speed is indicated in exaggerated form by the lines $c$ and $d$. At second critical speed the shaft whirls in two sections, there being a nodal point at about the central point of the shaft as is indicated at *e*. With the balancing ring 5 placed at the point *e* as indicated in Fig. 2, it will be clear that adjustment of the weight or weights in ring 5 will have little effect so far as balance at second critical speed is concerned. On the other hand, the weights in balancing rings 6 which are indicated as being in the vicinity of the bearings, may be adjusted for balance at second critical speed and since they are in the vicinity of the bearings, will have little effect on the balance at first critical speed.

On successive adjustments of the weights in balancing rings 5 and 6 it is possible to reduce the amplitude of vibrations to within allowable limits at first critical speed and at running speed.

By this arrangement, therefore, wherein I balance the rotor for first critical speed by means of a weight located in the vicinity of the nodal point of the second critical speed, and balance at the running speed by means of weights in the vicinity of the bearings, I am enabled to obtain a better balance at both the first critical speed and at the running speed, than is possible by the elimination of the balancing ring at the nodal point of the shaft at second critical speed.

What I claim as new and desire to secure by Letters Patent of the United States is:

1. The method of balancing a rotor intended for operation above the first critical speed which comprises balancing it for first critical speed by varying the mass in the vicinity of the nodal point at second critical speed and balancing it at running speed by varying the mass in the vicinity of the bearings of the rotor.

2. The combination with a rotor and bearings supporting the rotor, said rotor being intended for operation above the first critical speed, of weight means in the vicinity of the nodal point at second critical speed for balancing the rotor for first critical speed, and weight means in the vicinity of the bearings for balancing the rotor for running speed.

3. The method of balancing a rotor intended for operation above the first critical speed which comprises balancing it at a lower speed by varying the mass in the vicinity of the nodal point at second critical speed, and balancing it for running speed by varying the mass in the vicinity of the bearings of the rotor.

In witness whereof I have hereunto set my hand this 13th day of September, 1928.

FRANK C. LINN.